United States Patent
Cintora Gonzalez et al.

(10) Patent No.: US 11,472,162 B2
(45) Date of Patent: Oct. 18, 2022

(54) LAMINATED GLAZING

(71) Applicant: SAINT-GOBAIN GLASS FRANCE, Courbevoie (FR)

(72) Inventors: Octavio Cintora Gonzalez, Taverny (FR); Vincent Sauvinet, Grenoble (FR); Adèle Verrat Debailleul, Villers sur Coudun (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/964,817

(22) PCT Filed: Jan. 23, 2019

(86) PCT No.: PCT/FR2019/050145
§ 371 (c)(1),
(2) Date: Jul. 24, 2020

(87) PCT Pub. No.: WO2019/145638
PCT Pub. Date: Aug. 1, 2019

(65) Prior Publication Data
US 2021/0060905 A1 Mar. 4, 2021

(30) Foreign Application Priority Data
Jan. 26, 2018 (FR) ........................ 1850634

(51) Int. Cl.
*B32B 17/10* (2006.01)
*C03C 4/02* (2006.01)
*C03C 4/18* (2006.01)
*C03C 3/078* (2006.01)

(52) U.S. Cl.
CPC .... *B32B 17/1011* (2013.01); *B32B 17/10036* (2013.01); *B32B 17/10119* (2013.01); *B32B 17/10137* (2013.01); *B32B 17/10761* (2013.01); *C03C 3/078* (2013.01); *C03C 4/02* (2013.01); *C03C 4/18* (2013.01); *C03C 2204/00* (2013.01)

(58) Field of Classification Search
CPC .. C03C 3/078; C03C 4/18; C03C 4/02; B32B 17/10
USPC ........................................... 428/213
See application file for complete search history.

(56) References Cited

U.S. PATENT DOCUMENTS

| | | | |
|---|---|---|---|
| 5,077,133 A * | 12/1991 | Cheng | C03C 4/082 428/426 |
| 5,817,587 A | 10/1998 | Jeanvoine et al. | |
| 6,150,028 A * | 11/2000 | Mazon | B32B 17/10743 501/71 |
| 9,573,841 B1 | 2/2017 | Cid-Aguilar et al. | |
| 2002/0150744 A1 | 10/2002 | Nagai | |
| 2008/0149902 A1* | 6/2008 | Teyssedre | C03C 4/02 252/587 |
| 2018/0149867 A1* | 5/2018 | Kremers | B32B 17/10568 |
| 2018/0362390 A1* | 12/2018 | Claireaux | B32B 17/1011 |

FOREIGN PATENT DOCUMENTS

| | | | |
|---|---|---|---|
| CN | 1109848 A | 10/1995 | |
| CN | 1823021 A | 8/2006 | |
| CN | 105848884 A | 8/2016 | |
| CN | 106458743 A | 2/2017 | |
| WO | WO 2015/092385 A1 | 6/2015 | |
| WO | WO-2015092385 A1 * | 6/2015 | ....... B32B 17/10761 |
| WO | WO-2016198678 A1 * | 12/2016 | ......... G02B 27/0103 |
| WO | WO-2017103528 A1 * | 6/2017 | ............... C03C 4/18 |

OTHER PUBLICATIONS

International Search Report as issued in International Patent Application No. PCT/FR2019/050145, dated May 13, 2019.
Sundaram, S. K., "Impact of Redox in Industrial Glass Melting and Importance of Redox Control," 77th Conference on Glass Problems, May 2017, pp. 113-128.
First Office Action as issued in Chinese Patent Application No. 201980000927.6, dated Jun. 30, 2021.

* cited by examiner

*Primary Examiner* — Tahseen Khan
(74) *Attorney, Agent, or Firm* — Pillsbury Winthrop Shaw Pittman LLP

(57) ABSTRACT

A laminated glazing includes a first sheet of a colored glass and a second sheet of a clear glass which are joined together by a lamination interlayer, the first sheet having a thickness e1 ranging from 1.5 to 2.5 mm, the second sheet having a thickness e2 ranging from 0.4 to 1.9 mm, the ratio $R=e2/e1^2$ being at most 0.40 $mm^{-1}$, the glazing having a light transmission of at least 70% and a direct solar transmission of at most 55%, the colored glass having a chemical composition including a weight content of total iron, expressed in the form $Fe_2O_3$, ranging from 1.1 to 2.0%, with a redox ratio, defined as the ratio between the weight content of ferrous iron, expressed in the form FeO, and the weight content of total iron, expressed in the form $Fe_2O_3$, ranging from 0.23 to 0.32.

18 Claims, No Drawings

LAMINATED GLAZING

CROSS-REFERENCE TO RELATED APPLICATIONS

This application is the U.S. National Stage of PCT/FR2019/050145, filed Jan. 23, 2019, which in turn claims priority to French patent application number 1850634 filed Jan. 26, 2018. The content of these applications are incorporated herein by reference in their entireties.

The invention relates to the field of laminated glazings, more particularly motor vehicle laminated glazings, in particular used as windshields or side windows.

Laminated glazings are glazings in which two glass sheets are adhesively bonded together by a lamination interlayer which has the ability to retain glass fragments in the event of breakage. The lamination interlayer may also fulfill other functions, for example break-in resistance, acoustic, thermal, etc. functions. The lamination interlayer generally comprises at least one polymer sheet, typically made of polyvinyl butyral, capable of softening during the lamination treatment and of adhering to the glass sheets.

Laminated glazings are used in motor vehicles as windshield, and sometimes as side windows. In this regard, they must meet an increasing number of requirements, including mechanical requirements (they must withstand gravel impact), physical requirements (they must be as light as possible so as to penalize the energy consumption of the vehicle as little as possible), optical requirements (their transmission in the visible must be sufficient to allow good visibility for the driver) and thermal requirements (their transmission of solar radiation must be low so as, in summer, to reduce the solar heat gain and therefore the need for air conditioning), not to mention cost requirements. Other requirements themselves relate to the process for manufacturing these glazings. In particular, the two glass sheets of the laminated glazing must be able to be bent together so as to ensure a perfect assembly and prevent any optical distortions. Some of these requirements are contradictory, since a lighter glazing is a thinner glazing, that will have a tendency to withstand gravel impact less well and to transmit infrared radiation more.

The objective of the invention is to provide a laminated glazing that meets all of these requirements and which is not very expensive to manufacture.

In this regard, one subject of the invention is a laminated glazing comprising a first sheet of a colored glass and a second sheet of a clear glass which are joined together by means of a lamination interlayer, said first sheet having a thickness e1 ranging from 1.5 to 2.5 mm, said second sheet having a thickness e2 ranging from 0.4 to 1.9 mm, the ratio $R=e2/e1^2$ being at most 0.40 mm$^{-1}$, said glazing having a light transmission of at least 70% and a direct solar transmission of at most 55%, said colored glass having a chemical composition comprising a weight content of total iron, expressed in the form $Fe_2O_3$, ranging from 1.1 to 2.0%, with a redox ratio, defined as the ratio between the weight content of ferrous iron, expressed in the form FeO, and the weight content of total iron, expressed in the form $Fe_2O_3$, ranging from 0.23 to 0.32.

Another subject of the invention is a glazing for a transport vehicle, in particular a motor vehicle, in particular a windshield or a side window, comprising a laminated glazing according to the invention.

In this glazing, the second glass sheet is preferably the inner sheet, intended to be positioned on the inside of the passenger compartment of the vehicle.

The light transmission is calculated from an experimental spectrum produced on the glass sheet or the glazing considered, by taking into account the illuminant A defined by the standard ISO 11664-2 and the CIE 1931 reference observer (2°) defined by the standard ISO 11664-1. The direct solar transmission is determined according to the standard ISO 9050: 2003.

The expression "clear glass" is understood to mean glass for which the light transmission is at least 90% for a thickness of 2 mm. Clear glasses generally contain a weight content of total iron of at most 0.15%, in particular 0.1% and even 0.08%. However, the weight content of total iron of the clear glasses is generally at least 0.01% since the natural raw materials used in the melting of the glass contain iron impurities, and lower contents would require the use of particularly expensive raw materials. Clear glass does not generally contain colorants other than iron; in particular, it preferably does not contain cobalt oxide, chromium oxide, selenium, copper oxide, nickel oxide and oxides of rare-earth elements, apart from unavoidable impurities.

The choice of the thicknesses e1 and e2 and of the ratio R has proved particularly crucial for obtaining the desired resistance to gravel impact and also good optical and energy properties.

The thickness e2 is preferably at most 1.8 mm, in particular 1.7 mm, or 1.6 mm and even 1.5 mm. The thickness e2 is preferably at least 0.5 mm, in particular 0.6 mm, or 0.7 mm and even 0.8 mm or 0.9 mm. It is preferably within a range of from 0.5 to 1.7 mm.

The thickness e1 is preferably at most 2.4 mm, in particular 2.3 mm, or 2.2 mm or 2.1 mm. It is preferably at least 1.6 or 1.7 mm.

The ratio R is advantageously at most 0.35 or 0.30, in particular 0.25, or 0.20. It is preferably at least 0.10.

Particularly advantageous e1/e2 thickness pairs are in particular:
  e1=1.6 mm and e2=0.5 mm
  e1=1.6 mm and e2=0.7 mm
  e1=1.8 mm and e2=0.5 mm
  e1=1.8 mm and e2=0.7 mm
  e1=1.8 mm and e2=1.1 mm
  e1=2.1 mm and e2=0.5 mm
  e1=2.1 mm and e2=0.7 mm
  e1=2.1 mm and e2=1.1 mm
  e1=2.1 mm and e2=1.6 mm The glazing preferably consists of the first sheet, of the second sheet and of the lamination interlayer, which does not however exclude one of these constituents from being coated with layers or stacks of layers, as described below.

The glazing is preferably curved. In order to achieve this, the two glass sheets are bent, generally together, before being assembled by means of the lamination interlayer. The bending may be carried out in a known manner, for example by gravity (the glass deforming under its own weight) or by pressing, at temperatures typically ranging from 550 to 650° C.

When the glazing is curved, the second glass sheet is advantageously the inner sheet of the glazing, i.e. the one which is located on the concave side of the glazing; this sheet is intended to be positioned inside the passenger compartment of the vehicle. The first glass sheet is then the outer sheet, located on the convex side of the glazing; this sheet is intended to be positioned on the outside of the passenger compartment of the vehicle.

The lamination may also be carried out in a known manner by an autoclave treatment, for example at temperatures of from 110 to 160° C. and under a pressure ranging from 10 to 15 bar. Prior to the autoclave treatment, the air trapped between the glass sheets and the lamination interlayer may be eliminated by calendering or by vacuum.

In order to improve the resistance to gravel impact, the first glass sheet is preferably made of glass that is not mechanically reinforced. Therefore, in this case, it is neither toughened nor hardened. The expression "not mechanically reinforced" is understood to mean that the glass sheet has not been subjected to reinforcement by chemical toughening or using forced cooling means for the purpose of creating high compressive stresses at the surface of the glass sheet. This definition does not however exclude the possibility of using cooling means that are conventionally used and necessary for respecting the cycle times or for obtaining form stresses. During a process for forming motor vehicle glazing, it is in fact necessary to cool the glass after the forming thereof in order to respect the cycle times and to create form stresses by placing the periphery of the glazing under compression in order to increase the resistance of the edges to breaking. The expression "not mechanically reinforced" does not therefore exclude the presence of edge stresses.

The glass that is not mechanically reinforced is preferably such that the residual core tensile stress is at most 12 MPa, in particular 5 MPa, or 2 MPa. Such stress values are in particular obtained with cooling rates of at most 1° C. per second after bending, more specifically between the outlet of the bending furnace and the zone in which the temperature of the glass corresponds to its annealing temperature. The measurement of the residual stress is in particular carried out on a test specimen obtained by cutting from the glazing a parallelepipedal test specimen of 10 mm×50 mm, by separating the first glass sheet from the lamination interlayer, for example by thermally treating the test specimen at a temperature of from 150 to 200° C., then by measuring the stresses in the thickness of the glass sheet. The measurement of the stresses may for example be carried out using a biasographe, described in chapter 8 of the book "*Photoelasticity of Glass*" by H. Aben, C. Guillemet (1993) Springer Verlag.

The second glass sheet may not be mechanically reinforced or on the contrary may be made of toughened glass.

Still in order to improve the resistance to gravel impact, the second glass sheet is advantageously chemically toughened, since the thin thicknesses used make thermal toughening difficult. Chemical toughening (also referred to as "ion exchange") consists in bringing the surface of the glass into contact with a bath of molten salts (for example of potassium nitrate), so as to reinforce the surface of the glass by exchanging ions from the glass (for example sodium ions) with ions of larger ionic radius (for example potassium ions). This ion exchange in fact makes it possible to form compressive stresses at the surface of the glass and over a certain thickness. Preferably, the surface stress is at least 300 MPa, in particular 400 and even 500 MPa, and at most 700 MPa, and the thickness of the compression zone is at least 20 μm, typically between 20 and 50 μm. The stress profile may be determined in a known manner using a polarizing microscope equipped with a Babinet compensator.

The first sheet preferably consists of a soda-lime-silica glass.

A soda-lime-silica glass is understood to mean a glass containing silica as former oxide and sodium and calcium oxides as modifier oxides. A soda-lime-silica glass preferably has a chemical composition that comprises from 60 to 78% of silica ($SiO_2$), from 10 to 16% of soda ($Na_2O$) and from 5 to 15% of lime (CaO). As indicated above, this soda-lime-silica glass is preferably not mechanically reinforced.

According to one embodiment, the second sheet also consists of a soda-lime-silica glass. In this case the thickness e2 is preferably at least 0.6 mm. The second sheet is preferably made of glass that is not mechanically reinforced.

Other types of glass can however be used, in particular borosilicate, aluminosilicate or alumino-borosilicate glasses.

According to another embodiment, the second glass sheet consists in particular of an aluminosilicate glass, in particular of sodium aluminosilicate glass. The glass is then, preferably, chemically toughened. The thickness e2 is in this case advantageously at most 0.7 mm, or 0.6 mm, in particular within a range of from 0.4 to 0.55 mm.

The sodium aluminosilicate glass preferably comprises from 55 to 73% by weight of $SiO_2$, from 2 to 20% by weight of $Al_2O_3$ and from 9 to 17% by weight of $Na_2O$. It further comprises, advantageously, from 2 to 11% by weight of MgO, from 0 to 10% by weight of $K_2O$, less than 3% by weight of CaO and less than 10%, in particular less than 5% by weight of $B_2O_3$.

More particularly, the sodium aluminosilicate glass preferably has one of the following compositions, expressed as percentages by weight of oxides.

$SiO_2$: 55-71%, in particular 59-68%; $Al_2O_3$: 3-11%, in particular 4-10%; MgO: 4-11%, in particular 5-10%; $Na_2O$: 9-17%, in particular 10-14%; $K_2O$: 3-12%, in particular 5-11%; $B_2O_3$: <2%, in particular <0.5%; CaO: <1%, in particular <0.5%.

$SiO_2$: 55-70%, in particular 58-68%; $Al_2O_3$: 8-20%, in particular 9-18%; MgO: 2-8%, in particular 2-7%; $Na_2O$: 10-17%, in particular 11-16%; $K_2O$: 1 to 8%, in particular 1 to 6%; $B_2O_3$: <3%, in particular <2%; CaO: <1%, in particular <0.6%.

$SiO_2$: 60-73%, in particular 63-71%; $Al_2O_3$: 2-8%, in particular 3-6%; MgO: 6-11%, in particular 7-10%; $Na_2O$: 10-17%, in particular 11-16%; $K_2O$: <2%, in particular <1%; CaO: 0-3%, in particular 1-2%; $B_2O_3$: <2%, in particular <1%.

The weight content of total iron of the colored glass, expressed in the form $Fe_2O_3$, is preferably at least 1.2%, in particular 1.3%. It is preferably at most 1.9%, in particular 1.8%. It is preferably within a range of from 1.3 to 1.8%, in particular from 1.3 to 1.5% or from 1.5 to 1.7%.

The redox ratio of the colored glass is preferably at least 0.24, in particular 0.25. It is preferably at most 0.31, in particular 0.30, or 0.29 or 0.28. The redox ratio is preferably within a range of from 0.24 to 0.29, in particular from 0.25 to 0.28, of from 0.25 to 0.27.

The preferred contents of total iron and the preferred redox ratios presented above may be combined, in any possible combination. Preferred combinations are in particular an iron content ranging from 1.3 to 1.8% combined with a redox ratio ranging from 0.24 to 0.29, or from 0.25 to 0.28 or from 0.25 to 0.27, or else an iron content ranging from 1.3 to 1.5% combined with the same preferred redox ratio ranges, or else an iron content ranging from 1.5 to 1.7%, also combined with the same preferred redox ratio ranges.

The colored glass preferably contains no colorants other than iron oxide or titanium oxide. The latter is an impurity frequently contained in certain raw materials and may contribute to lightly coloring the glass. The content of titanium oxide is generally at most 0.1%, or 0.06%. The colored glass preferably does not contain cobalt oxide, nickel oxide, chromium oxide, selenium, copper oxide, vanadium oxide, manganese oxide. It preferably contains no rare-earth element oxide, in particular no cerium oxide. According to one variant, the colored glass may contain very small amounts of at least one aforementioned colorant in order to adjust the optical properties. In this case, the total content of colorants other than the iron and titanium oxides is preferably at most 40 ppm (1 ppm=0.0001%), in particular 30 or 20 ppm.

The direct solar transmission of the glazing is preferably at most 52%, in particular 50%, and even 48% or 46%, or 45%. It is in general at least 35%.

The light transmission of the glazing is preferably at most 80%, in particular at most 78% or 77%.

The thickness of the glazing is preferably at most 5 mm, in particular 4.5 mm, or 4 mm. It is in general at least 2.8 mm, in particular 3 mm.

At least one glass sheet is advantageously coated with an enamel layer over a portion of its surface, in particular at its periphery, so as to protect the seals used to fasten the glazing to the bodywork opening from ultraviolet radiation.

At least one glass sheet may be coated on a face turned toward the lamination interlayer with a stack of electrically-conductive and/or low-emissivity thin layers, in order to obtain a heated glazing or to further improve the thermal insulation of the glazing. Such a stack preferably comprises at least one thin silver layer flanked by at least two thin dielectric layers.

The lamination interlayer preferably comprises at least one sheet of polyvinyl acetal, in particular of polyvinyl butyral (PVB).

The lamination interlayer may be colored or colorless in order, if necessary, to adjust the optical or thermal properties of the glazing.

The lamination interlayer may advantageously have sound absorption properties in order to absorb airborne or solidborne sounds. It may in particular consist, for this purpose, of three polymeric sheets, including two so-called outer sheets of PVB flanking an inner polymeric sheet, optionally made of PVB, of lower hardness than that of the outer sheets.

The lamination interlayer may also have thermal insulation properties, in particular properties of reflection of the infrared radiation. It may, for this purpose, comprise a coating of thin layers with low emissivity, for example a coating comprising a thin silver layer or a coating alternating dielectric layers of different refractive indices, which is deposited on an inner PET sheet flanked by two outer PVB sheets.

The thickness of the lamination interlayer is generally within a range of from 0.3 to 1.5 mm, in particular from 0.5 to 1 mm. The lamination interlayer may have a thinner thickness on an edge of the glazing than at the center of the glazing in order to prevent the formation of a ghost image in the event of using a head-up display (HUD) system.

The following examples illustrate the invention in a nonlimiting manner.

Laminated glazings were obtained by laminating, in a known manner, two glass sheets using a 0.76-mm thick PVB interlayer.

The glass sheets used are described below.

Glass A1:

Soda-lime-silica glass containing 1.60% of total iron (expressed as $Fe_2O_3$) with a redox ratio of 0.26.

Glass A2:

Soda-lime-silica glass containing 1.36% of total iron (expressed as $Fe_2O_3$) with a redox ratio of 0.26.

Glass B1

Clear soda-lime-silica glass sold by the applicant under the name Planiclear and containing 0.05% of total iron (expressed as $Fe_2O_3$) with a redox ratio of 0.25.

Glass B2

Clear soda-lime-silica glass sold by the applicant under the name Planilux and containing 0.1% of total iron (expressed as $Fe_2O_3$) with a redox ratio of 0.25.

Glass C

Colored soda-lime-silica glass containing 0.8% of total iron (expressed as $Fe_2O_3$) with a redox ratio of 0.26.

Glass D

Colored soda-lime-silica glass containing 1.0% of total iron (expressed as $Fe_2O_3$) with a redox ratio of 0.26.

Glass E:

Sodium aluminosilicate glass chemically toughened so that the surface stress is greater than 400 MPa and the thickness in compression is greater than 20 μm.

The other glasses A to D are glasses that are not mechanically reinforced.

The light transmission (denoted by TL) and the direct solar transmission (denoted by TE) were calculated from experimental spectra obtained by spectrophotometry.

The resistance to gravel impact of the glazings is evaluated by measuring, during an impact test, the height from which dropping an indenter released above the glass causes the glazing to break. A grade is then attributed as a function of the height measured.

−: height less than 1000 mm

+: height between 1000 and 1200 mm

++: height greater than 1200 mm

Tables 1 to 4 below sum up the results obtained by indicating the type of glass chosen for the first sheet and the second sheet, the thicknesses e1 and e2, the value of the ratio R, the total thickness of the glazing, the light transmission, the direct solar transmission and finally the grade obtained in the test of resistance to gravel impact.

TABLE 1

|  | C1 | C2 | 1 | 2 | 3 |
|---|---|---|---|---|---|
| Glass 1 | C | D | A1 | A1 | A1 |
| e1 (mm) | 1.8 | 1.6 | 1.6 | 2.1 | 1.8 |
| Glass 2 | C | B1 | B1 | B1 | B1 |
| e2 (mm) | 1.4 | 0.7 | 0.7 | 1.1 | 1.1 |
| R ($mm^{-1}$) | 0.43 | 0.27 | 0.27 | 0.25 | 0.34 |
| Total thickness (mm) | 4 | 3.1 | 3.1 | 4 | 3.7 |
| TL (%) | 74.5 | 80.3 | 76.3 | 72.1 | 74.5 |
| TE (%) | 47.0 | 56.2 | 49.6 | 43.2 | 46.8 |
| Gravel impact | − | ++ | ++ | ++ | + |

TABLE 2

|  | 4 | 5 | 6 | 7 | 8 |
|---|---|---|---|---|---|
| Glass 1 | A1 | A1 | A2 | A2 | A2 |
| e1 (mm) | 2.1 | 2.1 | 2.1 | 2.1 | 1.6 |
| Glass 2 | B1 | B1 | B2 | B2 | B2 |
| e2 (mm) | 1.6 | 0.7 | 1.1 | 1.6 | 0.7 |
| R ($mm^{-1}$) | 0.36 | 0.16 | 0.25 | 0.36 | 0.27 |
| Total thickness (mm) | 4.5 | 3.6 | 4 | 4.5 | 3.1 |
| TL (%) | 72.0 | 72.2 | 72.7 | 72.5 | 76.8 |
| TE (%) | 43.0 | 43.3 | 44.4 | 44.0 | 50.7 |
| Gravel impact | + | ++ | ++ | + | ++ |

TABLE 3

| | 9 | 10 | 11 | 12 | 13 |
|---|---|---|---|---|---|
| Glass 1 | A2 | A2 | A2 | A2 | A2 |
| e1 (mm) | 2.1 | 2.1 | 1.6 | 2.1 | 2.1 |
| Glass 2 | B1 | B1 | B1 | E | E |
| e2 (mm) | 1.1 | 1.6 | 0.7 | 0.7 | 0.5 |
| R (mm$^{-1}$) | 0.25 | 0.36 | 0.27 | 0.16 | 0.11 |
| Total thickness (mm) | 4 | 4.5 | 3.1 | 3.6 | 3.4 |
| TL (%) | 73.0 | 72.8 | 76.9 | 72.5 | 72.5 |
| TE (%) | 44.7 | 44.5 | 51.0 | 43.6 | 43.6 |
| Gravel impact | ++ | + | ++ | ++ | ++ |

TABLE 4

| | 14 | 15 |
|---|---|---|
| Glass 1 | A2 | A2 |
| e1 (mm) | 1.6 | 1.8 |
| Glass 2 | E | E |
| e2 (mm) | 0.5 | 0.5 |
| R (mm$^{-1}$) | 0.20 | 0.15 |
| Total thickness (mm) | 2.9 | 3.1 |
| TL (%) | 77.0 | 76.5 |
| TE (%) | 50.9 | 49.7 |
| Gravel impact | ++ | ++ |

The comparative glazing C1 has a suitable direct solar transmission and also a suitable light transmission. However its resistance to gravel impact is not very high.

The comparative glazing C2 is better in terms of resistance to gravel impact but at the expense of its thermal properties. On the other hand, the glazings according to the invention 1 to 15 exhibit a good compromise between the mechanical and thermal requirements, for a low weight.

The invention claimed is:

1. A laminated glazing comprising a first sheet of a colored glass and a second sheet of a clear glass which are joined together by means of a lamination interlayer, said first sheet having a thickness e1 ranging from 1.5 to 2.5 mm, said second sheet consisting of a soda-lime-silica glass and having a thickness e2 ranging from 0.6 to 1.9 mm, the ratio R=e2/e1$^2$ being at most 0.40 mm$^{-1}$, said glazing having a light transmission of at least 70% and a direct solar transmission of at most 55%, said colored glass having a chemical composition comprising a weight content of total iron, expressed in the form Fe$_2$O$_3$, ranging from 1.3 to 2.0%, with a redox ratio, defined as the ratio between the weight content of ferrous iron, expressed in the form FeO, and the weight content of total iron, expressed in the form Fe$_2$O$_3$, ranging from 0.23 to 0.32.

2. The laminated glazing as claimed in claim 1, wherein the thickness e2 is within a range of from 0.6 to 1.7 mm.

3. The laminated glazing as claimed in claim 1, wherein the ratio R is at most 0.35 mm$^{-1}$.

4. The laminated glazing as claimed in claim 1, wherein the first sheet consists of a soda-lime-silica glass.

5. The laminated glazing as claimed in claim 1, wherein the first glass sheet is made of glass that is not mechanically reinforced.

6. The laminated glazing as claimed in claim 1, wherein the second glass sheet is chemically toughened.

7. The laminated glazing as claimed in claim 1, wherein the colored glass has a chemical composition comprising a weight content of total iron, expressed in the form Fe$_2$O$_3$, ranging from 1.3 to 1.8%.

8. The laminated glazing as claimed in claim 1, wherein the colored glass has a chemical composition such that the redox ratio is within a range of from 0.24 to 0.29.

9. The laminated glazing as claimed in claim 1, wherein the direct solar transmission is at most 50%.

10. The laminated glazing as claimed in claim 1, wherein a thickness of the laminated glazing is at most 5 mm.

11. The laminated glazing as claimed in claim 1, wherein the lamination interlayer comprises at least one sheet of polyvinyl acetal.

12. A glazing for a transport vehicle, comprising a laminated glazing as claimed in claim 1.

13. The glazing as claimed in claim 12, wherein the second glass sheet is an inner sheet, intended to be positioned on the inside of a passenger compartment of the vehicle.

14. The laminated glazing as claimed in claim 3, wherein the ratio R is at most 0.30 mm$^{-1}$.

15. The laminated glazing as claimed in claim 10, wherein the thickness of the laminated glazing is at most 4.5 mm.

16. The laminated glazing as claimed in claim 15, wherein the thickness of the laminated glazing is at most 4 mm.

17. The laminated glazing as claimed in claim 11, wherein the lamination interlayer comprises polyvinyl butyral.

18. The glazing as claimed in claim 12, wherein the transport vehicle is a motor vehicle, and the glazing is a windshield or a side window.

* * * * *